(12) United States Patent
Okuyama

(10) Patent No.: US 11,126,730 B2
(45) Date of Patent: Sep. 21, 2021

(54) INSPECTION SYSTEM

(71) Applicant: Mitsubishi Electric Corporation, Tokyo (JP)

(72) Inventor: Hiroshi Okuyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 313 days.

(21) Appl. No.: 16/253,441

(22) Filed: Jan. 22, 2019

(65) Prior Publication Data

US 2019/0332778 A1 Oct. 31, 2019

(30) Foreign Application Priority Data

Apr. 27, 2018 (JP) .............................. JP2018-086066

(51) Int. Cl.
*G06F 21/00* (2013.01)
*G06F 21/57* (2013.01)

(52) U.S. Cl.
CPC .................................. *G06F 21/577* (2013.01)

(58) Field of Classification Search
CPC ........ G06F 21/577; G06F 21/00; G06F 21/30; G06F 21/44
See application file for complete search history.

(56) References Cited

U.S. PATENT DOCUMENTS

| | | | | |
|---|---|---|---|---|
| 8,155,829 B2 * | 4/2012 | Takeda | .............. | H04L 12/40013 701/36 |
| 2012/0129517 A1 * | 5/2012 | Fox | ................... | H04L 25/03987 455/425 |
| 2014/0114497 A1 * | 4/2014 | Miyake | ................. | H04L 9/3271 701/1 |
| 2015/0150124 A1 * | 5/2015 | Zhang | ..................... | G06F 21/51 726/22 |
| 2016/0378443 A1 * | 12/2016 | Sun | ......................... | G06F 21/53 717/140 |
| 2017/0076516 A1 * | 3/2017 | Morita | .................... | G06F 21/31 |
| 2017/0147812 A1 * | 5/2017 | Ujiie | ..................... | B60R 16/023 |
| 2017/0286675 A1 * | 10/2017 | Shin | ......................... | G06F 1/12 |
| 2019/0031203 A1 * | 1/2019 | Fox | ........................ | G06F 21/577 |
| 2019/0114437 A1 * | 4/2019 | Kim | ....................... | B60R 25/10 |
| 2019/0116157 A1 * | 4/2019 | Kishikawa | .......... | H04L 63/1466 |

(Continued)

FOREIGN PATENT DOCUMENTS

JP 2015-214169 A 12/2015

*Primary Examiner* — Sarah Su
(74) *Attorney, Agent, or Firm* — Sughrue Mion, PLLC; Richard C. Turner

(57) ABSTRACT

Provided is an inspection system capable of inspecting whether or not a control device mounted to a vehicle normally operates also during usage. An inspection information generation unit of a server generates security inspection information for use in inspection of a function of an ECU on the basis of ECU design information and security information, and the security inspection information is transmitted to an ECU_GW. In the ECU_GW having received the security inspection information, an ECU_GW control unit performs a conversion process, and transmits information obtained by the conversion process to an ECU_A and an ECU_B. When receiving the information, each of the ECU_A and the ECU_B determines, with use of a determination reference held in advance, whether the received information is normal or abnormal.

20 Claims, 12 Drawing Sheets

(56) References Cited

U.S. PATENT DOCUMENTS

| | | | |
|---|---|---|---|
| 2019/0141069 A1* | 5/2019 | Pogorelik | B60W 10/06 |
| 2019/0268376 A1* | 8/2019 | Park | H04L 9/006 |
| 2019/0302753 A1* | 10/2019 | Fujii | H04L 63/1425 |
| 2019/0311120 A1* | 10/2019 | Jaenisch | G06F 21/552 |
| 2019/0332371 A1* | 10/2019 | Kobayashi | H04W 4/40 |
| 2019/0385057 A1* | 12/2019 | Litichever | G06N 3/08 |
| 2020/0027351 A1* | 1/2020 | Gotoda | B60W 50/085 |
| 2020/0036738 A1* | 1/2020 | Boukricha | H04L 63/1416 |
| 2020/0097663 A1* | 3/2020 | Sato | H04L 67/12 |
| 2020/0143053 A1* | 5/2020 | Gutierrez | G06F 21/566 |
| 2020/0228988 A1* | 7/2020 | Yang | H04L 9/0869 |

* cited by examiner

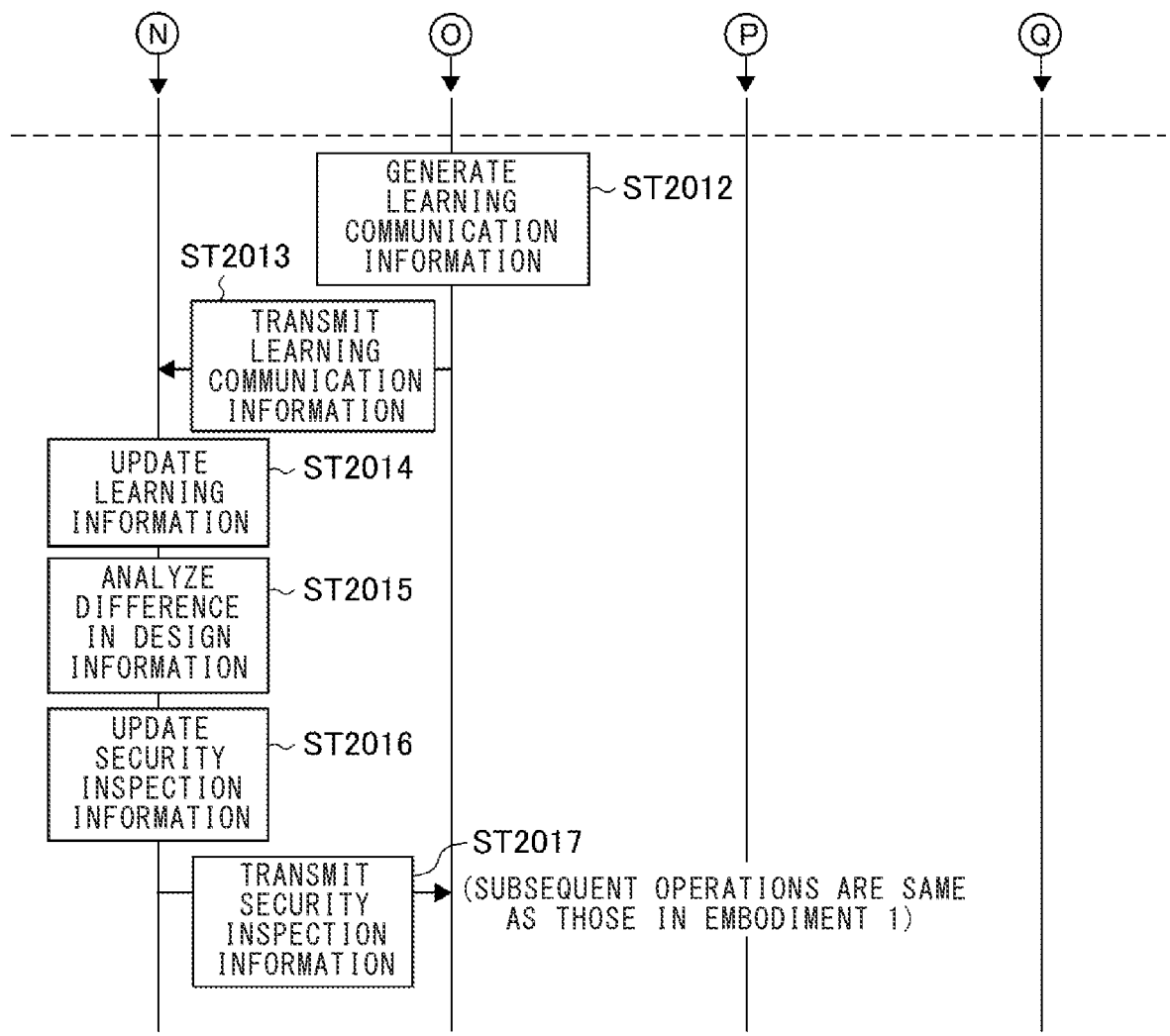

INSPECTION SYSTEM

BACKGROUND OF THE INVENTION

1. Field of the Invention

The present disclosure relates to an inspection system for inspecting a control device mounted to a vehicle.

2. Description of the Background Art

A plurality of electronic control devices called ECUs (Electronic Control Units) are mounted to a vehicle, and the ECUs are connected to one another over a network that enables wireless communication or wired communication. Some of the ECUs perform, with use of wireless communication means thereof, wireless communication with, for example, a device provided to a road present outside the vehicle, a house, or another vehicle, or a server provided to a car manufacturer or a vehicle-mounted part supply manufacturer, thereby achieving information sharing between the devices.

As part of this information sharing, failure diagnosis can be performed on the vehicle through acquisition of the state of each ECU from outside the vehicle, and new software can be transmitted from outside the vehicle to the ECU so that an update (e.g., an update of a map, for navigation or the like, that is included in the ECU) is performed in order to change the function of the ECU, whereby useful functions can be provided to end users.

However, it also becomes possible for a malicious person to transmit, by abusing the information sharing means, unauthorized information to the vehicle in order to cause an abnormal vehicle behavior. As a measure against such a case, a designer of a vehicle or an ECU designs a device so as to satisfy a functional requirement or a non-functional requirement such as security such that predictable unauthorized information can be dealt with.

After the ECU is mounted to the vehicle, such unauthorized information can be updated through improvement in calculation capacity, a new attack method, or the like. It is ideal that, if the updated information is transmitted to the vehicle, the ECU is prevented from performing an abnormal operation. However, the updated unauthorized information includes information that has been failed to be dealt with at the time of designing, and thus such information adversely affects vehicle operation.

In addition, also at the time of an update of the functions of some ECUs included in the vehicle, unauthorized information needs to be appropriately dealt with before and after the ECUs are mounted to the vehicle.

Patent Document 1 describes an inspection device capable of, in order to inspect an operation of an ECU, transmitting, to the ECU, data generated in advance on the basis of design information about the ECU and data obtained by replacing a part or the entirety of this data by random data, thereby accurately inspecting the operation of the ECU during usage.

Patent Document 1: Japanese Laid-Open Patent Publication No. 2015-214169 (pages 6 to 8, FIG. 1)

However, the following problems arise if the technique of Patent Document 1 is applied.

Only a "design stage" is taken into consideration for the design information in Patent Document 1, and Patent Document 1 does not describe dealing with design information that is updated/added in a usage stage. It is assumed that, in the usage stage after an end user acquires the vehicle, the design information is changed owing to various factors. If, without this change being taken into consideration, such data as to cause a security-related abnormality is generated on the basis of the information obtained in the design stage and is transmitted, it may be determined that an abnormality has occurred even though no abnormality has occurred.

In addition, the inspection device of Patent Document 1 is intended for inspection of the ECU by a gateway or a server, and is not configured to enable inspection of the gateway itself. Thus, it may not be possible to appropriately ascertain whether the gateway is normally functioning.

SUMMARY OF THE INVENTION

The present disclosure has been made to solve the above problems, and an object of the present disclosure is to provide an inspection system capable of inspecting whether or not a control device of a vehicle normally operates while the vehicle is powered on.

An inspection system according to the present disclosure is an inspection system including: a plurality of control devices mounted to a vehicle and capable of communicating with one another; and an inspection device configured to inspect functions of the plurality of control devices via a network from outside the vehicle. The inspection device includes an inspection information generation unit configured to generate security inspection information for use in inspection of a function of a first control device on the basis of design information about the plurality of control devices and separately collected security information, and transmits, to the first control device, the security inspection information generated by the inspection information generation unit. The first control device includes a gateway control unit configured to convert, into first inspection data for a second control device, the security inspection information transmitted from the inspection device, and transmits, to the second control device, the first inspection data obtained by the conversion by the gateway control unit. The second control device includes: a reference database storing a determination reference for determining whether or not the first inspection data transmitted from the first control device falls within a normal range; and a first determination unit configured to compare the first inspection data with the determination reference, to determine whether the first inspection data is normal or abnormal.

The inspection system according to the present disclosure is capable of inspecting whether or not the control device mounted to the vehicle normally operates also during usage.

BRIEF DESCRIPTION OF THE DRAWINGS

FIGS. 4A, 4B, and 4C illustrate a sequence chart showing flow for the inspection system according to embodiment 2;

DETAILED DESCRIPTION OF THE PREFERRED EMBODIMENTS OF THE INVENTION

Embodiment 1

Figure 1:
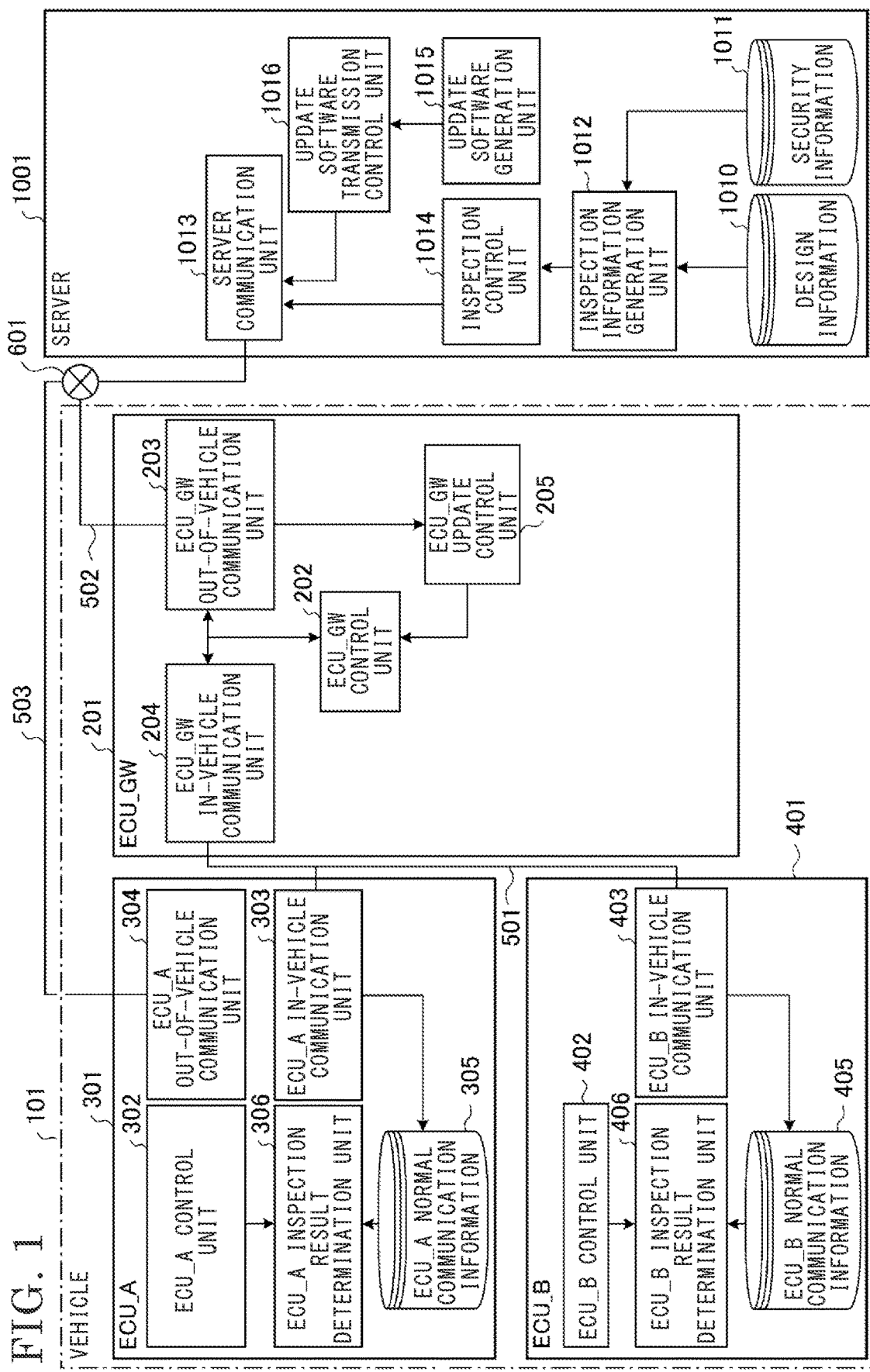
FIG. 1 is a block diagram showing a schematic configuration of an inspection system according to embodiment 1.

FIG. 1 is a block diagram showing a schematic configuration of an inspection system according to embodiment 1.

In FIG. 1, a vehicle 101 is mounted with control devices, i.e., an ECU_GW 201, an ECU_A 301, and an ECU_B 401, and these control devices are connected via wired communication 501.

A server 1001 is provided outside the vehicle 101, and the vehicle 101 and the server 1001 are connected via wireless communication 502 and a communication network 601 and via wireless communication 503 and the communication network 601.

The server 1001 (inspection device) is configured as follows.

In order to inspect the ECUs mounted to the vehicle 101, the server 1001 transmits, via the wireless communication 502 to the vehicle 101, security inspection information which is inspection data generated from design information 1010 about the ECUs at a certain time point, and separately collected security information 1011.

An inspection information generation unit 1012 generates the security inspection information from the security information 1011 and the design information 1010 about the ECUs at a certain time point. A server transmission/reception unit 1013 transmits/receives in/out-of-vehicle communication information including the security inspection information to/from the vehicle via the communication network 601 and the wireless communication 502.

An inspection control unit 1014 performs control for transmitting the security inspection information to the vehicle through the server transmission/reception unit 1013.

The server 1001 has a program or a functional specification for each ECU of the vehicle 101. The program or the functional specification includes, in addition to a currently incorporated version, a new version obtained through an update in the future.

An update software generation unit 1015 automatically generates update programs regarding the ECUs of the vehicle 101, or an administrator of the server 1001 causes the update programs to be stored. An update software transmission control unit 1016 performs control for transmitting the update software to the vehicle through the server transmission/reception unit 1013.

In embodiment 1, the security inspection information will be described as information for inspecting the ECU_GW 201.

Here, the design information 1010 and the security information 1011 will be described in detail.

The design information 1010 is information obtained by accumulating, for example, presuppositions that are unable to be determined and that are taken into consideration at the time of designing of a process and a device, regarding software and hardware implementing a physical/logical network architecture and a physical/logical function between each ECU and the corresponding ECU mounted to the vehicle 101. The design information 1010 is stored in a database.

The security information 1011 is information obtained by accumulating, for example, known vulnerability information or incidents reported not only in the automobile industry but also in various industries, or vulnerability information about a device revealed by performing a penetration test on the server or the ECUs. The security information 1011 is stored in a database that is different from the database storing the design information 1010.

The security information 1011 is updated as soon as new threat or vulnerability information is found after the vehicle 101 is owned by an end user.

Information outputted from the server 1001 is the security inspection information obtained in consideration of both the design information 1010 and the security information 1011. The security inspection information is transmitted via the wireless communication 502. The security inspection information is information for inspecting a function of the ECU_GW 201 of serving as a gateway for sensing information and received information thereof, and the like, in addition to a reception function of the ECU_GW 201 regarding the wireless communication 502 thereof.

The ECU_GW 201 (first control device) is configured as follows.

The ECU_GW 201 is a gateway in the vehicle, and is an ECU that monitors the state of a driver, has an input and an output for entertainment-related navigation or a brought-in device such as a smartphone, and displays information on a combination meter.

An ECU_GW control unit 202 (gateway control unit) has a gateway function, and transfers received data or processes this data and then transmits data obtained by the processing. That is, the ECU_GW control unit 202 transfers data, which is received from the server 1001 or any of the ECUs in the vehicle, via the wired communication 501 or the wireless communication 502 without changing the received data, or changes the received data via control by itself and then transmits the resultant data to another ECU or a device outside the vehicle.

The ECU_GW 201 converts the security inspection information received from the server 1001, into data (first inspection data and second inspection data) for the ECU_A 301 (second control device) and the ECU_B 401 (third control device), and transmits the data to the ECU_A 301 and the ECU_B 401, respectively.

An ECU_GW out-of-vehicle communication unit 203 is connected to the communication network 601 via the wireless communication 502. An ECU_GW in-vehicle communication unit 204 is connected to the ECU_A 301 and the ECU_B 401 in the vehicle via the wired communication 501.

An ECU_GW update control unit 205 performs control for transmitting, to each in-vehicle ECU to be updated, update software for the ECU received from the server 1001.

The ECU_A 301 (second control device) is configured as follows.

The ECU_A 301 may be an ADAS (Advanced Driver Assistant System) ECU for performing driving assistance, or a V2X (Vehicle to X: X represents a device located outside the vehicle and provided to a vehicle, a house, transportation infrastructure, or the like) ECU.

The ECU_A 301 receives data transmitted through the wired communication 501 in the vehicle.

In embodiment 1, as a more preferable mode, the ECU_A 301 has a communication path for the wireless communication 503 through which its own data is transmitted to the outside of the vehicle 101.

An ECU_A control unit 302 controls its own control device. An ECU_A in-vehicle communication unit 303 transmits/receives data via the wired communication 501 in the vehicle. An ECU_A out-of-vehicle communication unit 304 transmits/receives data to/from the outside of the vehicle 101 via the communication path for the wireless communication 503.

ECU_A normal communication information 305 is normal communication information serving as a determination reference for determining whether or not the data transmitted from the ECU_GW 201 falls within a normal range, and the ECU_A normal communication information 305 is stored in a database (reference database).

An ECU_A inspection result determination unit 306 (first determination unit) compares, with the ECU_A normal communication information 305, information (first inspection data) obtained by converting the security inspection information transmitted from the ECU_GW 201, thereby determining whether or not the information obtained by the conversion falls within a normal range.

The ECU_B 401 (third control device) is configured as follows.

The ECU_B 401 is an ECU related to a body, a chassis, or the like, and does not transmit information via the wireless communication 503 to the outside of the vehicle without another device relaying the information.

The ECU_B 401 is connected to the ECU_A 301 and the ECU_GW 201 via the wired communication 501, and can communicate with the other ECUs in the vehicle.

An ECU_B control unit 402, an ECU_B in-vehicle communication unit 403, ECU_B normal communication information 405, and an ECU_B inspection result determination unit 406 (second determination unit) are equivalent to the ECU_A control unit 302, the ECU_A in-vehicle communication unit 303, the ECU_A normal communication information 305, and the ECU_A inspection result determination unit 306, respectively, of the ECU_A 301.

The ECU_B normal communication information 405 is a determination reference for determining whether or not information (second inspection data) obtained by converting the security inspection information transmitted from the ECU_GW 201 falls within a normal range, and the ECU_B normal communication information 405 is stored in a database (separate reference database).

The determination reference of the ECU_B 401 is different from that of the ECU_A 301 and enables determination as to whether or not the data transmitted from the ECU_GW 201 falls within the normal range.

Candidates for the determination references of the ECU_A 301 and the ECU_B 401 are reception intervals or possible values of data outputted on the basis of the result of a fail-safe function or a security measure function of the ECU_GW 201.

In addition to a range within which a normal control state is obtained, a range within which a fail-safe or a security measure is operated is defined, and determination is performed as to whether the reception intervals or the possible values do not deviate from the ranges.

In a case where the result of the determination is neither normality nor abnormality, it can be determined that an unexpected operation has occurred owing to the security inspection information.

A predetermined relation (predetermined relationship) is established between the determination references, in the ranges for the reception intervals and the possible values, of the ECU_A 301 and the ECU_B 401.

Here, a relationship will be focused and described that is established between the determination references of the reception intervals, in a case where the ECU_A 301 functions as the ADASECU having a traffic lane maintaining function and the ECU_B 401 functions as an electric power steering ECU that decides a steering amount on the basis of data received from the ECU_A 301.

The ECU_GW 201 receives, through out-of-vehicle communication by a GPS (Global Positioning System) or the like, a signal for identifying an absolute position of the vehicle 101, and transmits data to the ADASECU and the electric power steering ECU on the basis of the received data.

Data reception intervals in the ADASECU and the electric power steering ECU in this case are generally longer than a reception interval at which values detected by a sensor which is mounted to the vehicle 101 and which detects the state of a driver are received from the ECU_GW 201.

Thus, in this case, a relationship is established in which both data reception intervals in the ECU_A 301 and the ECU_B 401 are longer than a predetermined time period. In a case where, of the intervals at which the ECU_GW 201 performs transmission to the ECU_A 301 and the ECU_B 401, one of the intervals is shorter than the predetermined time period and the other interval is longer than the predetermined time period, this relationship is not established and it can be found that the ECU_GW 201 suffers from a certain abnormality.

Next, operations will be described.

Operations of the inspection system according to embodiment 1 will be described with reference to a sequence chart in FIGS. 2A, 2B, and 2C.

In step ST1001, the server 1001 generates the security inspection information for inspecting the ECU_GW 201.

In step ST1002, the security inspection information generated by the server 1001 is transmitted to the ECU_GW 201.

In step ST1003, the ECU_GW 201 receives the security inspection information.

In step ST1004, the ECU_GW 201 transmits the received security inspection information to the server 1001. At this time, the ECU_GW 201 performs, on the security inspection information, encryption using common key cryptography or public key cryptography, or a conversion process (predetermined process) such as unidirectional conversion using a hash function.

In step ST1005, the server 1001 determines whether the information transmitted from the ECU_GW 201 is not different from the information transmitted from the server 1001.

In a case where it is determined that no difference is present therebetween, inspection of the ECU_GW 201 is continued, and the process proceeds to step ST1006.

In a case where it is determined that a difference is present therebetween, it can be assumed that an abnormality has occurred in the wireless communication 502, or a reception process or a transmission process by the ECU_GW 201, and thus the inspection is stopped.

In step ST1006, the ECU_GW 201 converts the security inspection information into inspection data for each ECU on the basis of the function of the ECU_GW 201.

In step ST1007 and step ST1008, the inspection data obtained by converting the security inspection information are transmitted to the ECU_A 301 and the ECU_B 401.

(Pattern 2-1: In a Case where Determination is Performed on the Inspection Data in Each of the ECU_A 301 and the ECU_B 401)

In step ST1009, the ECU_A 301 and the ECU_B 401 receive the inspection data.

In step ST1010 and step ST1011, the ECU_A 301 and the ECU_B 401 each compare the received inspection data and the determination reference with each other, thereby determining whether or not the received inspection data satisfies the reference. (the description of pattern 2-1 ends here)

(Pattern 2-2: In a Case where Determination is Performed as to the Relationship in Terms of Inspection Data Between the ECU_A 301 and the ECU_B 401)

Alternatively, the ECU_A 301 has, as one determination reference (relationship determination reference), the relationship between the inspection data received by itself and inspection data that should be received by the ECU_B 401 at this time. In this case, in step ST1012, the ECU_A 301 and the ECU_B 401 receive the inspection data, and the ECU_B 401 performs a process equivalent to that in step ST1006, in step ST1013, the ECU_B 401 transmits, to the ECU_A 301, inspection data obtained by the received inspection data being converted for the ECU_A 301, and, in step ST1014 and step ST1015, the ECU_A 301 checks whether the relationship serving as the determination reference is established between the two pieces of inspection data, i.e., the inspection data of its own and the inspection data received from the ECU_B 401. (the description of pattern 2-2 ends here)

Next, determination result transmission from the ECU_A 301 to the server 1001 will be described. The ECU_A 301 can communicate with the server 1001 via the wireless communication 503 different from the wireless communication 502 of the ECU_GW 201. The sequence in this configuration will be described below.

In step ST1016, in a case where the correlation or the other determination reference is not satisfied in the determination in step ST1011 or step ST1015, the result of the determination is generated.

In step ST1017, the result of the determination is transmitted to the server 1001.

In step ST1018, the server 1001 receives the result of the determination.

In step ST1019, a program (update software) and a functional specification corrected to satisfy the determination reference are generated on the basis of the received result of the determination.

In step ST1020, the corrected program, i.e., the update software, is transmitted to the ECU_GW 201.

In step ST1021, the ECU_GW 201 performs an update to apply the corrected program.

According to embodiment 1, as functions of the ECU_GW 201, it is possible to check whether information exchanged between the server 1001 and the ECU_GW 201 is not defective, and it is possible to accurately check whether the function of transmission/reception by the ECU_GW 201 via the wireless communication 502 and the function of transmission of data to the ECU_A 301 and the ECU_B 401 by the ECU_GW 201 are operated normally or abnormally.

That is, by inspecting the operation of the ECU_GW 201 on the basis of the variable determination reference provided in the vehicle, it is possible to accurately check whether or not the ECU mounted to the vehicle normally operates even during usage.

In addition, in a case where data is appropriately transmitted to the ECU_A 301 but data is not appropriately transmitted to the ECU_B 401, even if the data accidentally fall within allowable ranges for the determination references of the ECU_A 301 and the ECU_B 401, robust determination can be performed as to abnormality by taking into consideration the correlation between the data of both ECUs.

In addition, it is possible to immediately correct the software in a case of finding of abnormal data with use of the security inspection information.

In the aforementioned description of embodiment 1, the example where the ECU_GW 201 is an ECU to be inspected has been described, but the same applies to a case where a separate ECU is an ECU to be inspected.

That is, the present disclosure can be implemented as long as the separate ECU is an ECU mounted to the vehicle 101 and having a function of performing transmission to the other ECUs on the basis of received data.

In addition, in the aforementioned description, a configuration in which the security inspection information is transmitted from the server 1001 via the wireless communication 502 is employed, but the present disclosure is not limited thereto. As long as a configuration in which the security inspection information is transmitted is employed, the transmission may be performed from a device other than the server 1001, and wired communication may be used instead of the wireless communication.

As an example of the wired communication, the security inspection information generated with an inspection tool used by a dealer or the like may be transmitted in a state where the inspection tool is connected to a DLC (Data Link Coupler).

In addition, in the aforementioned description, the configuration of the inspection system is as shown in FIG. 1. However, the number of the ECUs and the method for communication line connection between the ECUs, are not limited to those shown therein, and the present disclosure can be implemented as long as a configuration is employed in which an ECU having received the security inspection information transmits data based on the security inspection information to the other ECUs.

Embodiment 2

Figure 3:
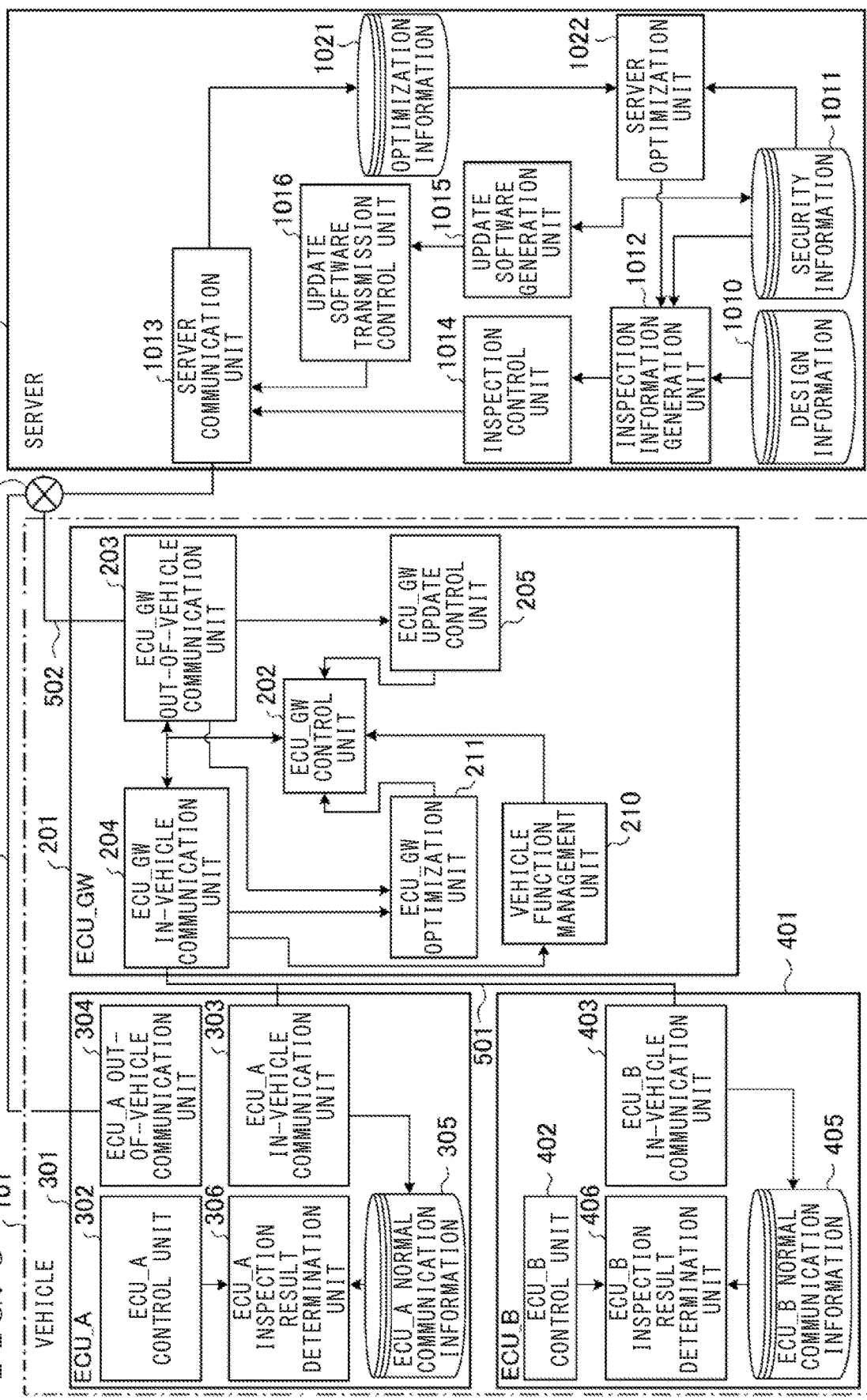
FIG. 3 is a block diagram showing a schematic configuration of an inspection system according to embodiment 2.

FIG. 3 is a block diagram showing a schematic configuration of an inspection system according to embodiment 2.

In FIG. 3, reference characters 101, 201 to 205, 301 to 306, 401 to 403, 405, 406, 501 to 503, 601, 1001, and 1010 to 1016 are the same as those in FIG. 1. In FIG. 3, the ECU_GW 201 includes a vehicle function management unit 210 and an ECU_GW optimization unit 211. The server 1001 includes optimization information 1021 and a server optimization unit 1022.

The vehicle function management unit 210 of the ECU_GW 201 manages a function constituting the ECU_GW control unit 202 at a predetermined timing, and functions constituting the control units of the ECU_A 301 and the ECU_B 401. That is, the vehicle function management unit 210 includes a list and details of functions of performing control by the ECU_GW control unit 202 at a time $t_n$, the ECU_A control unit 302, and the ECU_B control unit 402.

The ECU_GW optimization unit 211 (function change unit) performs learning from the design information 1010 on the basis of the sensing information detected by the ECU_GW 201 and communication information obtained via communication (information inputted to its own control device), and changes the function of the ECU_GW 201, i.e., changes a process time period, a process cycle, or a process detail constituting the ECU_GW control unit 202.

The optimization information 1021 of the server 1001 is a part or the entirety of the sensing information detected by the ECU_GW 201 and the communication information inputted to the ECU_GW 201, both information being transmitted from the ECU_GW 201. The optimization information 1021 is stored in a database as information for learning based on the design information 1010.

The server optimization unit 1022 performs learning on the basis of the optimization information 1021 transmitted from the ECU_GW 201, and changes the function of the server 1001.

Next, operations will be described.

The vehicle function management unit 210 of the ECU_GW 201 has a list and details of functions of performing gateway control and control of its own control device, at the time $t_n$. The vehicle function management unit 210 also has a list and details of the same functions at a time $t_{n+1}$ after the time $t_n$.

The vehicle function management unit 210 irregularly or regularly checks whether or not a process cycle, a process time period, or a formally written process detail of the function of the ECU_GW 201 has changed within a period from the time $t_n$ to the time $t_{n+1}$. If any change has been made, a function-change detail is reported to the ECU_A 301 or the ECU_B 401.

The ECU_A 301 or the ECU_B 401 has a function of updating the determination reference in accordance with the reported function-change detail.

Figure 4A:
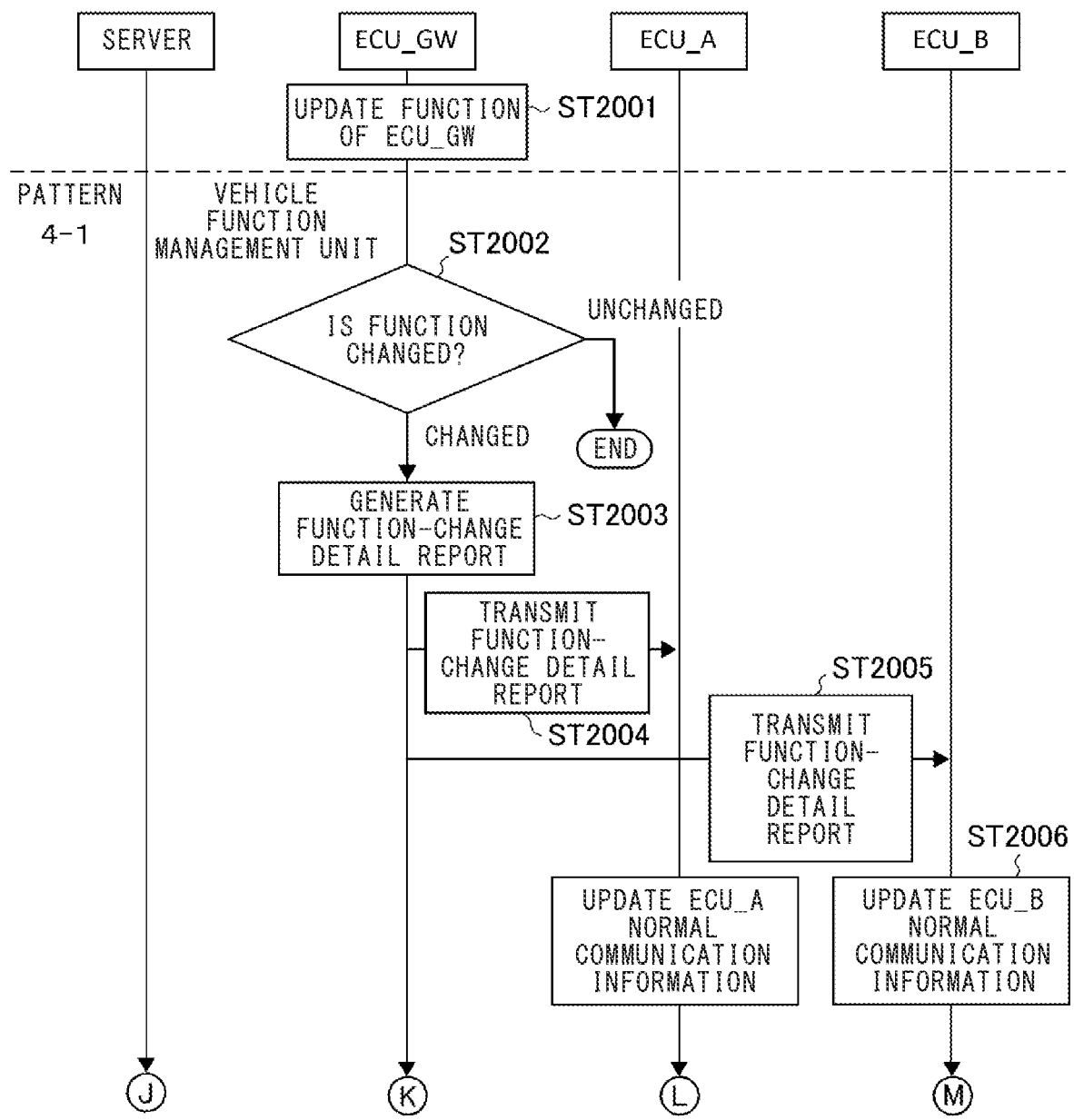
Figure 4B:
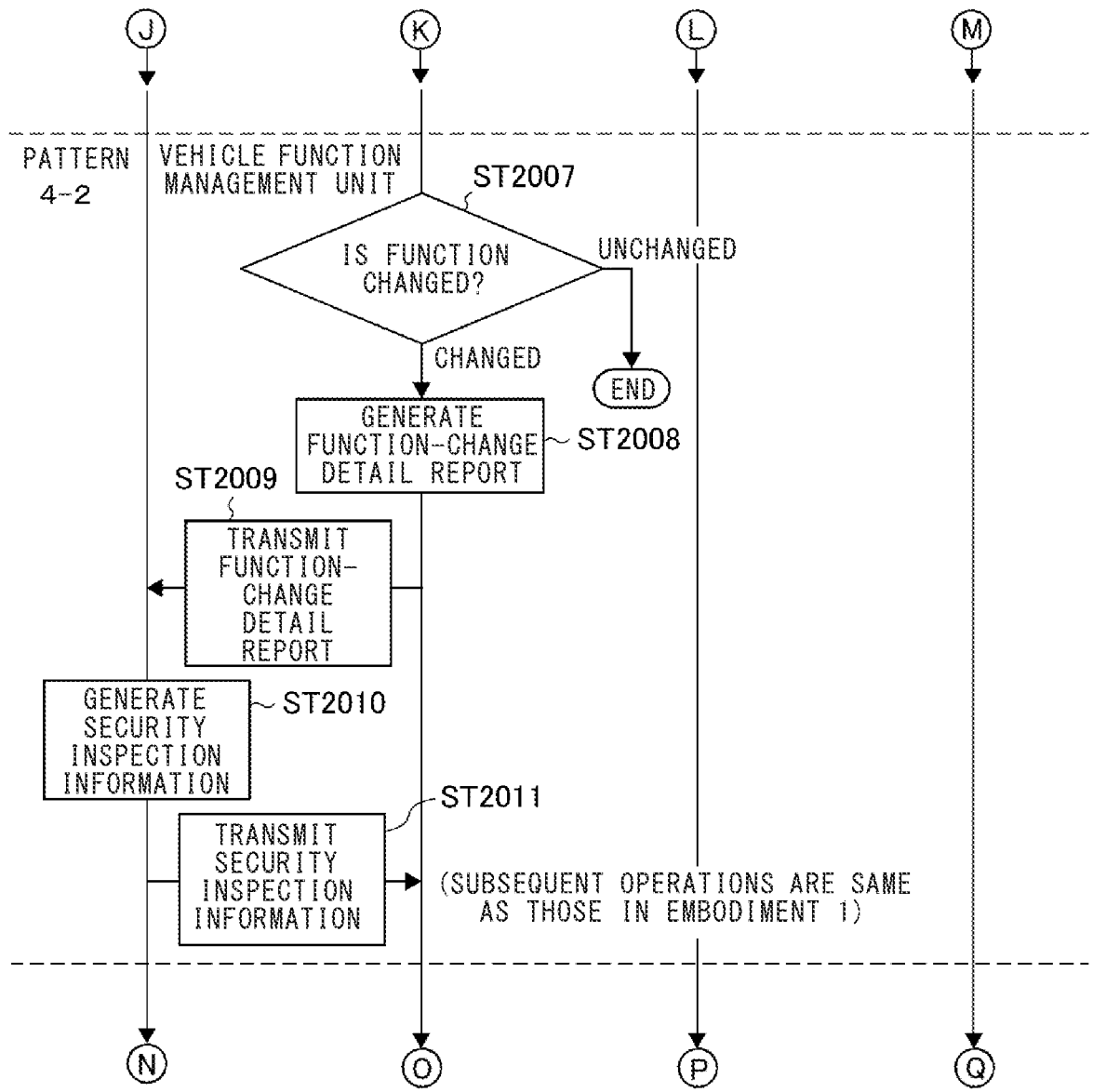

Next, the inspection system according to embodiment 2 will be described with reference to a sequence chart in FIGS. 4A, 4B, and 4C.

In step ST2001, it is detected that the function of the ECU_GW control unit 202 of the ECU_GW 201 has been updated.

(Pattern 4-1: In a Case where the Function Change is Reported to the ECU_A 301 and the ECU_B 401)

In step ST2002, whether the function updated within a period from the time $t_n$ to the time $t_{n+1}$ is equal to or greater than a predetermined value is checked, and, if no change has been made, the process is ended.

On the other hand, if any change has been made, the process proceeds to step ST2003.

In step ST2003, function-change detail report data (function-change detail) is generated to report the function change and the change detail to the other ECUs.

In step ST2004 and step ST2005, the function-change detail report data is transmitted to each ECU mounted to the vehicle 101.

In step ST2006, the determination reference (normal communication information) of each ECU is updated on the basis of the function-change detail report data. (the description of pattern 4-1 ends here)

(Pattern 4-2: In a Case where the ECU_GW 201 Reports the Function Change Also to the Server 1001)

In a case where the vehicle function management unit 210 detects a change in the function of the ECU_GW control unit 202, the ECU_GW 201 reports the function change also to the server 1001. Operations in this case will be described below.

A process in step ST2007 is the same as that in step ST2002, and thus the description thereof is omitted.

In step ST2008, the function-change detail report data is generated to report that the function change has been made.

In step ST2009, the generated function-change detail report data is transmitted to the server 1001.

In step ST2010, the server 1001 receives the function-change detail report data, detects that the functional configuration of the ECU included in the vehicle 101 has been changed, and generates the security inspection information.

In step ST2011, the generated security inspection information is transmitted to the ECU_GW 201 again. (the description of pattern 4-2 ends here)

Figure 2A:
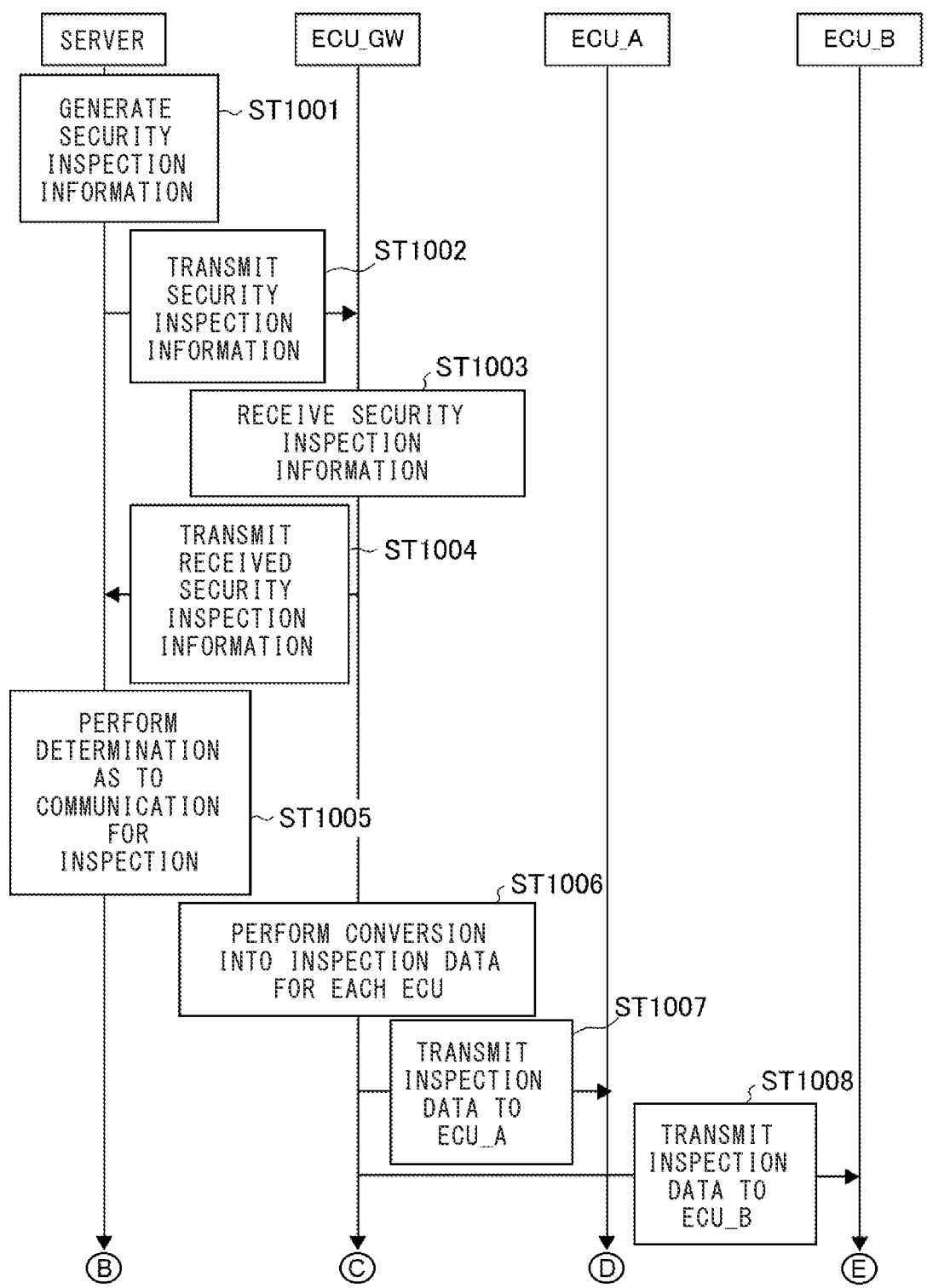
FIGS. 2A, 2B, and 2C illustrate a sequence chart showing flow for the inspection system according to embodiment 1.
Figure 2B:
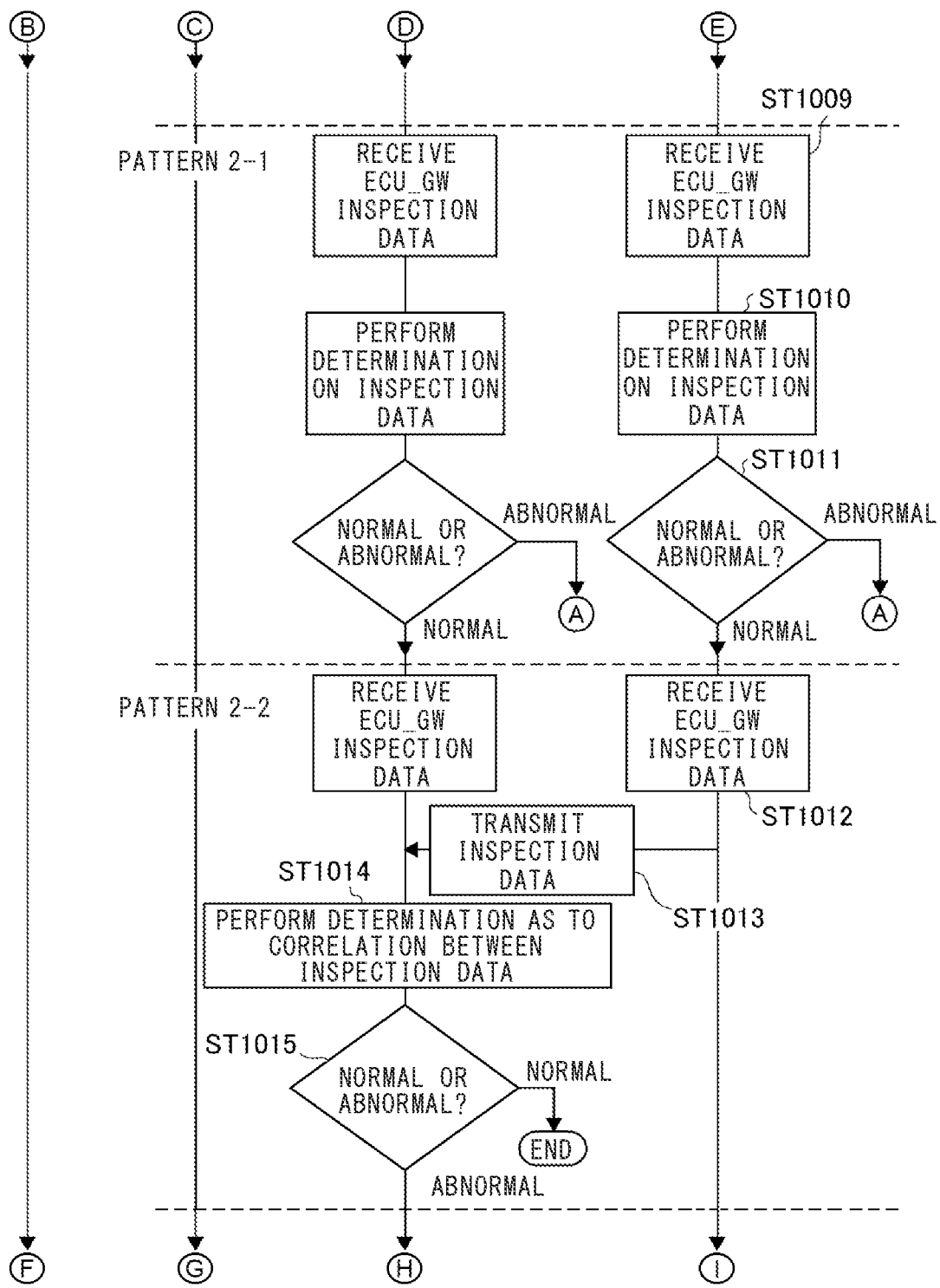
Figure 2C:
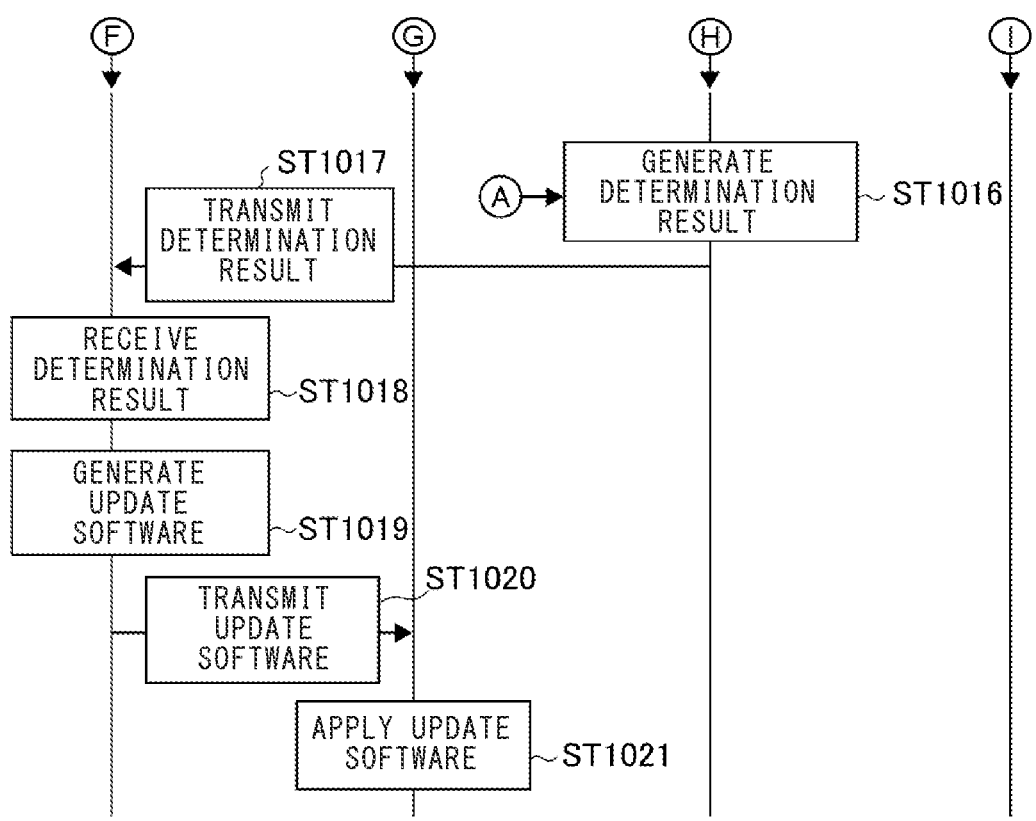

Subsequent operations are the same as the operations in and subsequent to step ST1003 in FIG. 2A.

Other than a method in which new software is inputted from outside, the ECU_GW 201 in embodiment 2 performs, as the cause of the function change, learning from the design information 1010 on the basis of the communication information and the sensing information detected by the ECU_GW 201, thereby performing the function change.

Also, the server 1001 includes the server optimization unit 1022 capable of learning, as in the learning algorithm mounted to the ECU_GW 201.

Next, operations of the server optimization unit 1022 will be described in the explanation of operations in and subsequent to step ST2012.

In step ST2012, the ECU_GW 201 collects and accumulates learning communication information which is data used for learning. In step ST2013, the ECU_GW 201 transmits the learning communication information to the server 1001 at a timing when the learning communication information is collected.

In step ST2014, the server 1001 receives the data, and adds the data to a learning database held as the optimization information 1021.

In step ST2015, a function changed, through learning, from the design information 1010 obtained at the time to (difference in the design information) is analyzed by the server optimization unit 1022.

In step ST2016, the security inspection information is updated so as to become security inspection information generated with, in addition to the design information 1010 and the security information 1011, a focus only on a portion changed through the learning.

In step ST2017, the updated security inspection information is transmitted to the ECU_GW 201.

Subsequent operations are the same as the operations in and subsequent to step ST1003 in FIG. 2A.

Next, an example of the learning in embodiment 2 will be described.

The data used for the learning are sensing data indicating a detected state of the driver and data of the ECUs at the time of traveling, and the learning is performed such that driving assistance that does not give any discomfort to the driver is performed in response to instructions transmitted to the ECU_A 301 and the ECU_B 401, in accordance with the state of the driver.

A degree of satisfaction of the driver is inputted to the ECU_GW 201, and, while using the degree as teacher data, the learning continues such that an evaluation value becomes an optimum value, whereby the process cycle, the process time period, and the process detail to be transmitted to the ECU_A 301 and the ECU_B 401 are changed.

According to embodiment 2, also if the function of each ECU has been updated, the security inspection information can be evaluated with the determination reference using the latest information of the ECU based on the updated function.

In addition, it is possible to immediately check whether the updated function is appropriately reflected in the security inspection information.

In addition, the server optimization unit 1022 predicts and limits the function change as to which inspection is to be performed, thereby being capable of ending, in a short time period, the inspection performed with use of the security inspection information.

Although the learning is described as supervised learning in embodiment 2, the present disclosure is not limited thereto. Any learning method may be employed as long as the condition that a change is made to the function through learning, is satisfied.

In addition, although the sensing information about the driver is used as data to be learned by the ECU_GW 201 in embodiment 2, the data to be learned is not limited thereto. Any learning data may be used as long as the condition that the ECU_GW 201 performs learning and data to be outputted to the ECUs connected via the wired communication 501 is changed on the basis of the learning, is satisfied.

Embodiment 3

Figure 5:
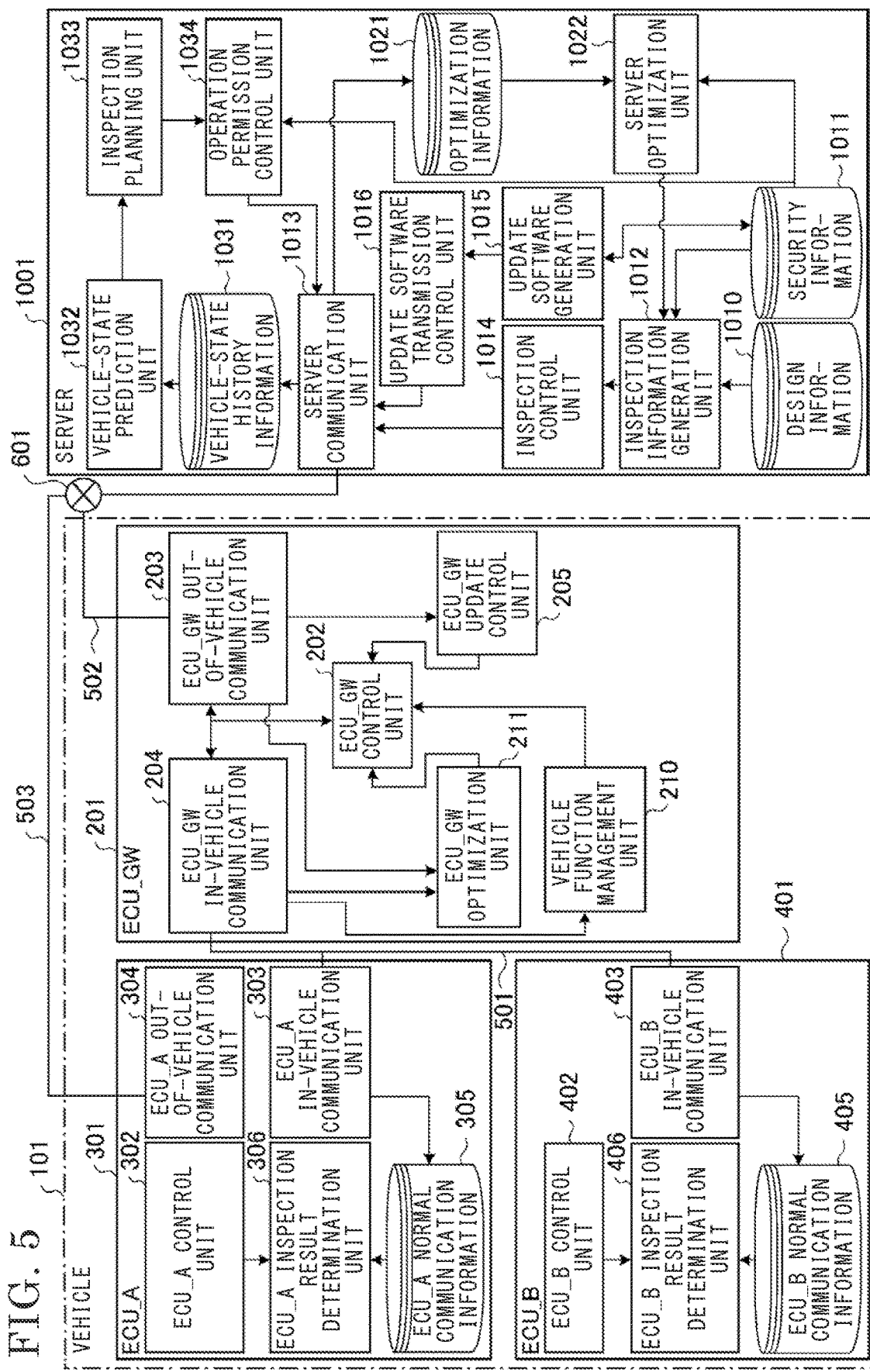
FIG. 5 is a block diagram showing a schematic configuration of an inspection system according to embodiment 3.

FIG. 5 is a block diagram showing a schematic configuration of an inspection system according to embodiment 3.

In FIG. 5, reference characters 101, 201 to 205, 210, 211, 301 to 306, 401 to 403, 405, 406, 501 to 503, 601, 1001, 1010 to 1016, 1021, and 1022 are the same as those in FIG. 1. In FIG. 5, the server 1001 includes vehicle-state history information 1031, a vehicle-state prediction unit 1032, an inspection planning unit 1033, and an operation permission control unit 1034.

The vehicle-state history information 1031 is a history of a state of the vehicle 101, and the like, transmitted from the vehicle 101 side and a history of a schedule and the like of a user. The histories are accumulated in a database (history database).

The vehicle-state prediction unit 1032 has a prediction algorithm for predicting a state that is to be assumed by the vehicle 101 after elapse of a predetermined time period, on the basis of data of the vehicle-state history information 1031.

The inspection planning unit 1033 makes, on the basis of the prediction by the vehicle-state prediction unit 1032, a plan as to at what time the security inspection information is to be transmitted to the vehicle, and has a function (inspection advance-notification unit) of presenting the plan to a user (driver or owner).

In a case where neither of the driver and the owner permit inspection to be performed with use of the security inspection information, or in a case where no inspection plan can be made on the basis of the vehicle-state history information 1031, the operation permission control unit 1034 instructs the ECUs to stop some or all of processes of the ECUs.

Next, operations will be described.

In embodiment 3, the ECU_GW 201 of the vehicle 101 detects data of a previous state of the vehicle 101, the position thereof and a time in this state, and the like, and transmits the data to the server 1001.

The server 1001 accumulates, in the database, the history of the state of the vehicle 101, and the like, transmitted from the vehicle 101 side and the history of the schedule and the like of the user, as the vehicle-state history information 1031. On the basis of the accumulated data of the vehicle-state history information 1031, the vehicle-state prediction unit 1032 predicts a future state of the vehicle 101.

Then, the inspection planning unit 1033 makes, on the basis of the predicted future state of the vehicle 101, an inspection plan according to which the security inspection information can be transmitted, and presents the inspection plan to the user.

If, even though an inspection has to be performed, the user does not permit the inspection or no inspection plan can be made on the basis of the vehicle-state history information 1031, the operation permission control unit 1034 generates an instruction for restricting the operation of the vehicle 101.

Figure 6A:
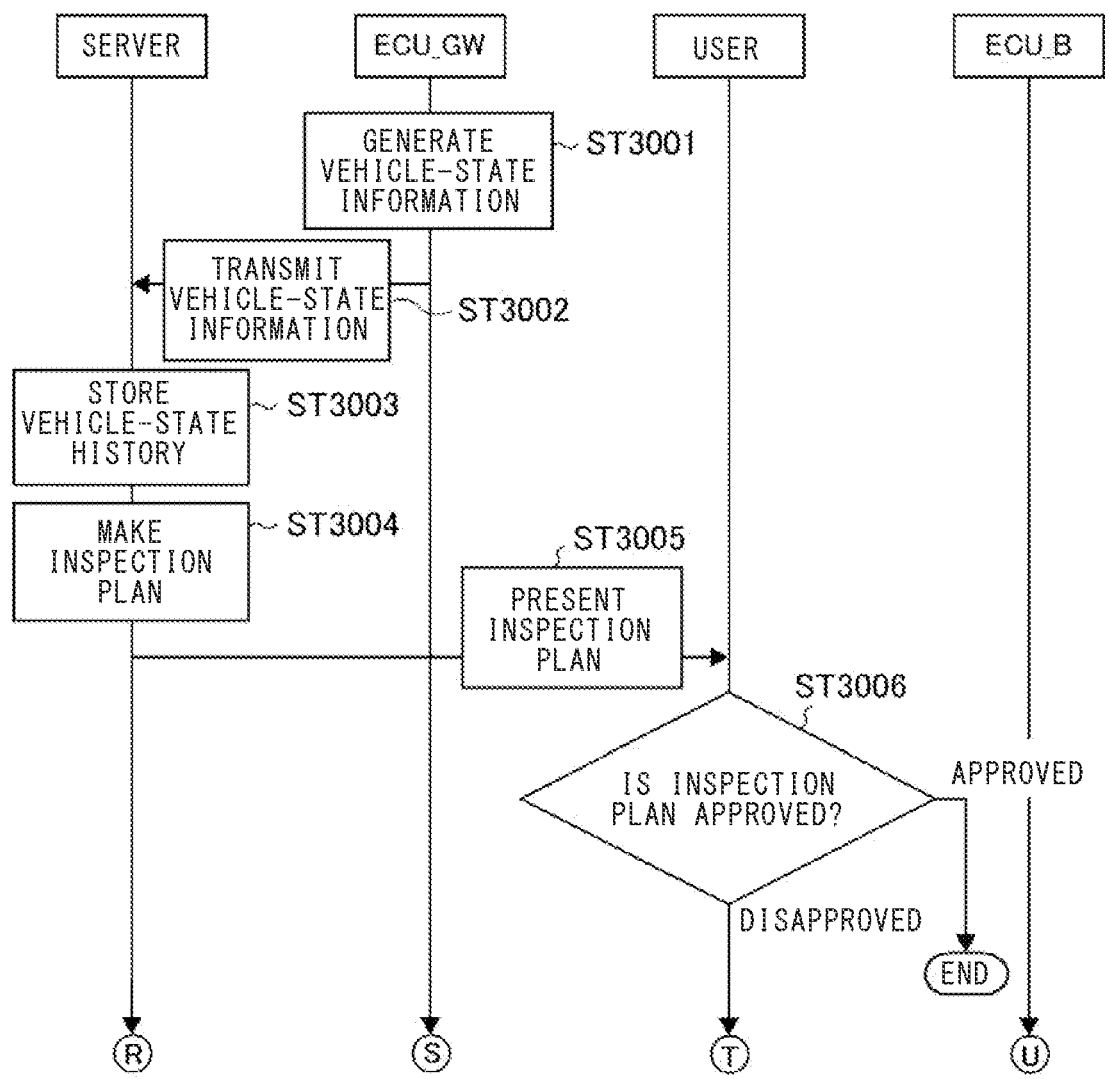
FIGS. 6A and 6B illustrate a sequence chart showing interaction between a user and the inspection system according to embodiment 3, and flow for the interaction.
Figure 6B:
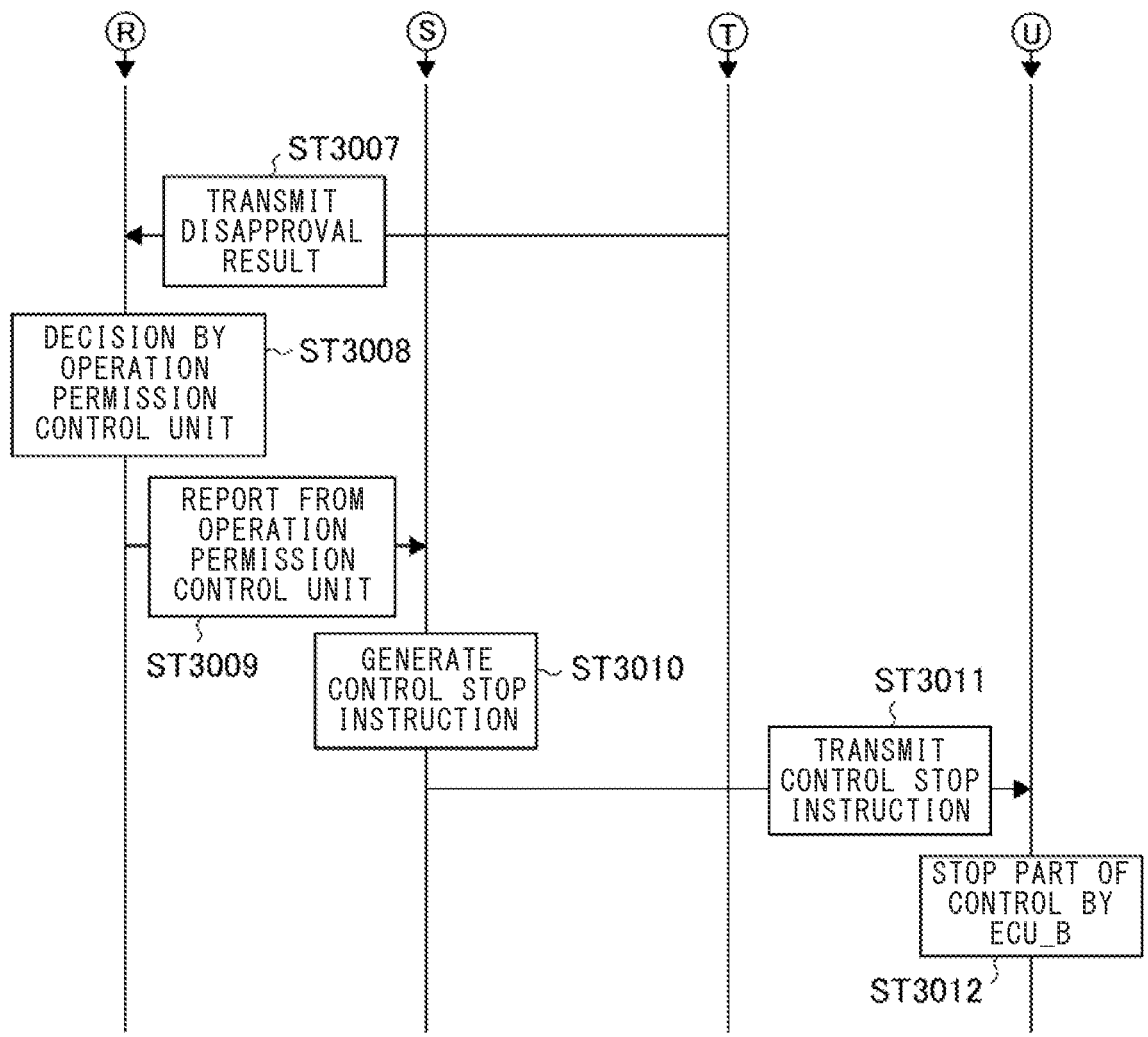

Next, operations of the inspection system according to embodiment 3 will be described with reference to a sequence chart in FIGS. 6A and 6B.

In step ST3001, the ECU_GW 201 generates vehicle-state information in which a time, and a state and the position of the vehicle 101 are associated with one another.

In step ST3002, the ECU_GW 201 transmits the generated vehicle-state information to the server 1001.

In step ST3003, in the server 1001, in addition to the received information about the state and the position of the vehicle 101 and the time in this state, information about the date and time and a schedule is associated from a schedule table registered by the user, and is stored in the database as the vehicle-state history information 1031.

In step ST3004, on the basis of the previous vehicle-state history information 1031 stored in the database, the vehicle-state prediction unit 1032 checks the probability/feasibility of the schedule table of the user, and decides a date and time at which inspection is predicted to be able to be performed.

Then, the inspection planning unit 1033 makes, on the basis of the security information 1011, a plan so as to enable preferential inspection of an ECU having a risk that the vulnerability is highly likely to be exploited by threat and that influence when the vulnerability is exploited is great, and the inspection information generation unit 1012 generates the security inspection information.

The inspection planning unit 1033 makes an inspection plan such that the security inspection information is generated for all of the ECUs, in a case where there is no significant difference in such a risk among the ECUs.

In step ST3005, it is reported to the user that an inspection is to be performed at the date and time when an inspection can be performed.

In step ST3006, the user determines whether there is no problem with the presented inspection date and time. In a case where there is no problem with the inspection date and time, an inspection is performed at the inspection date and time. However, in a case where the user makes a choice of changing the inspection date and time or canceling the inspection, the process proceeds to step ST3007, and it is reported to the server 1001 that the inspection date and time has been disapproved.

In step ST3008, taking into consideration a risk to be inflicted if the inspection is not performed, the operation permission control unit 1034 generates a report indicating that only a portion that is predicted to be not affected, or to be less likely to be affected, by the security information 1011 is permitted to be operated.

In step ST3009, the report from the operation permission control unit 1034 is transmitted to the ECU_GW 201.

In step ST3010, the ECU_GW 201 generates a control stop instruction for an ECU that is likely to be affected among the ECUs connected to the wired communication 501 of the ECU_GW 201 or for a part of the function of the ECU (here, a part of the function of the ECU_B 401).

In step ST3011, the ECU_GW 201 transmits the control stop instruction to the targeted ECU_B 401.

In step ST3012, the ECU_B 401 stops a part of the control operation until the next inspection is performed.

According to embodiment 3, with the aforementioned configuration, since a plan is made as to the inspection timing on the basis of the habit of the user or the schedule table of the user, usage of the vehicle 101 by the user is not restricted.

In addition, in a state where no inspection has been performed, if the vehicle 101 needs to be moved, ECUs other than the ECU to be inspected can be operated, and, if an ECU that is not related to running, turning, or stopping is to be inspected, traveling can also be performed.

Figure 7:
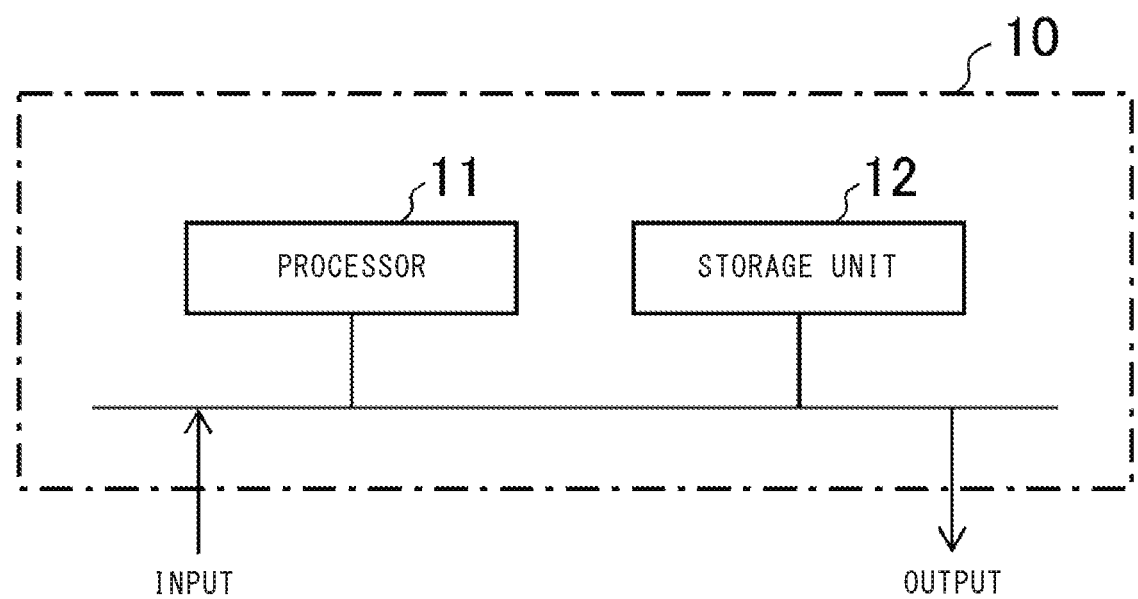
FIG. 7 is a diagram showing a hardware configuration of a control device and a server of the inspection system according to any of embodiment 1 to embodiment 3.

Each of the control devices 10 which are the ECUs described in embodiment 1 to embodiment 3 is composed of at least a processor 11 and a storage unit 12, an example of hardware thereof being shown in FIG. 7.

Although not shown, the storage unit 12 includes a volatile storage unit such as a random access memory, and a nonvolatile auxiliary storage unit such as a flash memory. Alternatively, a hard disk may be used instead of the flash memory as the auxiliary storage unit.

The processor 11 executes a program inputted from the storage unit 12. In this case, the program is inputted from the auxiliary storage unit via the volatile storage unit to the processor 11. In addition, the processor 11 may output data such as a calculation result to the volatile storage unit of the storage unit 12, or may save the data in the auxiliary storage unit via the volatile storage unit.

The server 1001 has the same hardware configuration as that of the control device 10.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the present disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10 control device
11 processor
12 storage unit
101 vehicle
201 ECU_GW
202 ECU_GW control unit
203 ECU_GW out-of-vehicle communication unit
204 ECU_GW in-vehicle communication unit
205 ECU_GW update control unit
210 vehicle function management unit
211 ECU_GW optimization unit
301 ECU_A
302 ECU_A control unit
303 ECU_A in-vehicle communication unit
304 ECU_A out-of-vehicle communication unit
305 ECU_A normal communication information
306 ECU_A inspection result determination unit
401 ECU_B
402 ECU_B control unit
403 ECU_B in-vehicle communication unit
405 ECU_B normal communication information
406 ECU_B inspection result determination unit
501 wired communication
502 wireless communication
503 wireless communication
601 communication network
1001 server
1010 design information
1011 security information
1012 inspection information generation unit
1013 server transmission/reception unit
1014 inspection control unit
1015 update software generation unit
1016 update software transmission control unit
1021 optimization information
1022 server optimization unit
1031 vehicle-state history information
1032 vehicle-state prediction unit
1033 inspection planning unit
1034 operation permission control unit

What is claimed is:

1. An inspection system comprising:
a plurality of controllers mounted to a vehicle and capable of communicating with one another; and
an inspector to inspect functions of the plurality of controllers via a network from outside the vehicle, wherein
the inspector
includes an inspection information generator to generate security inspection information for use in inspection of a function of a first controller on the basis of design information about the plurality of controllers and separately collected security information, and
transmits, to the first controller, the security inspection information generated by the inspection information generator, as a transmitted version of the security inspection information,
the first controller
receives the security inspection information from the inspector, as a received version of the security inspection information, and transmits the received version of the security inspection information to the inspector,
includes a gateway controller to convert, into first inspection data for a second controller, the security inspection information received from the inspector, and
transmits, to the second controller, the first inspection data obtained by the conversion by the gateway controller,
the second controller includes
a reference database storing a first determination reference for determining whether or not the first inspection data transmitted from the first controller falls within a first normal range, and
a first determinator to compare the first inspection data with the first determination reference, to determine whether the first inspection data is normal or abnormal,
before the gateway controller of the first controller converts the security inspection information, the inspector determines whether the received version of the security inspection information corresponds to the transmitted version of the security inspection information, and in response to determining that the received version of the security inspection information corresponding to the transmitted version of the security inspection information, enables the gateway controller of the first controller to convert the security inspection information.

2. The inspection system according to claim 1, wherein the first controller performs a predetermined process on the security inspection information transmitted from the inspector, and then transmits the security inspection information to the inspector.

3. The inspection system according to claim 2, wherein the first controller converts, by means of the gateway controller, the security inspection information into second inspection data for a third controller separate from the second controller, and transmits, to the third controller, the second inspection data obtained by the conversion, and the third controller includes
a separate reference database storing a second determination reference for determining whether or not the second inspection data transmitted from the first controller falls within a second normal range, the second determination reference being different from the first determination reference of the second controller, and
a second determinator to compare the second inspection data with the second determination reference stored in the separate reference database, to determine whether the second inspection data is normal or abnormal.

4. The inspection system according to claim 3, wherein the first controller includes a vehicle function manager to manage the functions of the plurality of controllers, in a case where the vehicle function manager detects that a function of the gateway controller has been changed, a function-change detail is transmitted to the second controller and the third controller, and the second controller and the third controller respectively update the first and the second determination references of its own control devices on the basis of the function-change detail transmitted from the first controller.

5. The inspection system according to claim 4, wherein, in the case where the vehicle function manager detects that the function of the gateway controller has been changed, the first controller transmits the function-change detail to the inspector, and the inspector generates the security inspection information reflecting the function-change detail, and transmits the security inspection information to the first controller.

6. The inspection system according to claim 1, wherein the first controller converts, by means of the gateway controller, the security inspection information into second inspection data for a third controller separate from the second controller, and transmits, to the third controller, the second inspection data obtained by the conversion, and the third controller includes
a separate reference database storing a second determination reference for determining whether or not the second inspection data transmitted from the first controller falls within a second normal range, the second determination reference being different from the first determination reference of the second controller, and
a second determinator to compare the second inspection data with the second determination reference stored in the separate reference database, to determine whether the second inspection data is normal or abnormal.

7. The inspection system according to claim 6, wherein the first controller includes a vehicle function manager to manage the functions of the plurality of controllers, in a case where the vehicle function manager detects that a function of the gateway controller has been changed, a function-change detail is transmitted to the second controller and the third controller, and the second controller and the third controller respectively update the first and the second determination references of its own control devices on the basis of the function-change detail transmitted from the first controller.

8. The inspection system according to claim 7, wherein, in the case where the vehicle function manager detects that the function of the gateway controller has been changed, the first controller transmits the function-change detail to the inspector, and the inspector generates the security inspection information reflecting the function-change detail, and transmits the security inspection information to the first controller.

9. The inspection system according to claim 1, wherein the first controller includes a function changer to change the function of the gateway controller on the basis of information inputted to its own controller, and transmits the inputted information to the inspector, and
the inspector analyzes the inputted information received from the first controller, so that a result of the analysis is reflected in generation, of the security inspection information, by the inspection information generator.

10. The inspection system according to claim 1, wherein the inspector includes:
a history database in which vehicle-state history information obtained by accumulating vehicle-state information is stored, the vehicle-state information being collected from the vehicle;
a vehicle-state predictor to predict, from the vehicle-state history information, a vehicle state that is to be assumed after elapse of a predetermined time period; and
an inspection planner to make, on the basis of the vehicle state predicted by the vehicle-state predictor, a plan as to at what time the security inspection information is to be transmitted to the vehicle.

11. The inspection system according to claim 1, wherein the inspector includes:
an inspection advance-notificator to give, to a driver or an owner of the vehicle, an advance notification of the time at which the security inspection information is to be transmitted to the vehicle; and
an operation permission controller to give an instruction for permitting or stopping execution of some or all of the functions of the control devices, on the basis of information obtained in response to the advance notification given from the inspection advance-notificator.

12. An inspection system comprising:
a plurality of controllers mounted to a vehicle and capable of communicating with one another, and
an inspector to inspect functions of the plurality of controllers via a network from outside the vehicle, wherein the inspector
includes an inspection information generator to generate security inspection information for use in inspection of a function of a first controller on the basis of design information about the plurality of controllers and separately collected security information, and transmits, to the first controller, the security inspection information generated by the inspection information generator, the first controller includes a gateway controller to convert, into first inspection data for a second controller, the security inspection information transmitted from the inspector, and transmits, to the second controller, the first inspection data obtained by the conversion by the gateway controller, and the second controller includes a reference database storing a first determination reference for determining whether or not the first inspection data transmitted from the first controller falls within a first normal range, and a first determinator to compare the first inspection data with the first determination reference, to determine whether the first inspection data is normal or abnormal, the first controller converts, by means of the gateway controller, the security inspection information into second inspection data for a third controller separate from the second controller, and transmits, to the third controller, the second inspection data obtained by the conversion, and the third controller includes a separate reference database storing a second determination reference for determining whether or not the second inspection data transmitted from the first controller falls within a second normal range, the second determination reference being different from the first determination reference of the second controller, and a second determinator to compare the second inspection data with the second determination reference stored in the separate reference database, to determine whether the second inspection data is normal or abnormal, the second controller has a relationship determination reference for determining whether or not a predetermined relationship is established between: the first inspection data obtained by the security inspection information being converted for its own control device by the gateway controller; and the second inspection data obtained by the security inspection information being converted for the third controller by the gateway controller, the third controller converts the second inspection data into third inspection data for the second controller, and transmits the third inspection data to the second controller, and, in the second controller, the first determinator determines, with use of the relationship determination reference, whether or not the predetermined relationship is established with the third inspection data transmitted from the third controller.

13. The inspection system according to claim 12, wherein, in a case where the predetermined relationship is not established with the third inspection data transmitted from the third controller, the second controller transmits a result of the determination to the inspector.

14. The inspection system according to claim 13, wherein the first controller includes a vehicle function manager to manage the functions of the plurality of controllers, in a case where the vehicle function manager detects that a function of the gateway controller has been changed, a function-change detail is transmitted to the second controller and the third controller, and the second controller and the third controller update the respective determination references of its own control devices on the basis of the function-change detail transmitted from the first controller.

15. The inspection system according to claim 12, wherein the first controller includes a vehicle function manager to manage the functions of the plurality of controllers, in a case where the vehicle function manager detects that a function of the gateway controller has been changed, a function-change detail is transmitted to the second controller and the third controller, and the second controller and the third controller respectively update the first and the second determination references of its own control devices on the basis of the function-change detail transmitted from the first controller.

16. The inspection system according to claim 15, wherein, in the case where the vehicle function manager detects that the function of the gateway controller has been changed, the first controller transmits the function-change detail to the inspector, and the inspector generates the security inspection information reflecting the function-change detail, and transmits the security inspection information to the first controller.

17. An inspection system comprising:

a plurality of controllers mounted to a vehicle and capable of communicating with one another, and an inspector to inspect functions of the plurality of controllers via a network from outside the vehicle, wherein the inspector includes an inspection information generator to generate security inspection information for use in inspection of a function of a first controller on the basis of design information about the plurality of controllers and separately collected security information, and transmits, to the first controller, the security inspection information generated by the inspection information generator, the first controller includes a gateway controller to convert, into first inspection data for a second controller, the security inspection information transmitted from the inspector, and transmits, to the second controller, the first inspection data obtained by the conversion by the gateway controller, and the second controller includes a reference database storing a first determination reference for determining whether or not the first inspection data transmitted from the first controller falls within a first normal range, and a first determinator to compare the first inspection data with the first determination reference, to determine whether the first inspection data is normal or abnormal, the first controller performs a predetermined process on the security inspection information transmitted from the inspector, and then transmits the security inspection information to the inspector, the first controller converts, by means of the gateway controller, the security inspection information into second inspection data for a third controller separate from the second controller, and transmits, to the third controller, the second inspection data obtained by the conversion, and the third controller includes
- a separate reference database storing a second determination reference for determining whether or not the second inspection data transmitted from the first controller falls within a second normal range, the second determination reference being different from the first determination reference of the second controller, and
- a second determinator to compare the second inspection data with the second determination reference stored in the separate reference database, to determine whether the second inspection data is normal or abnormal, the second controller has a relationship determination reference for determining whether or not a predetermined relationship is established between: the first inspection data obtained by the security inspection information being converted for its own control device by the gateway controller; and the second inspection data obtained by the security inspection information being converted for the third controller by the gateway controller, the third controller converts the second inspection data into third inspection data for the second controller, and transmits the third inspection data to the second controller, and in the second controller, the first determinator determines, with use of the relationship determination reference, whether or not the predetermined relationship is established with the third inspection data transmitted from the third controller.

18. The inspection system according to claim 17, wherein, in a case where the predetermined relationship is not established with the third inspection data transmitted from the third controller, the second controller transmits a result of the determination to the inspector.

19. The inspection system according to claim 18, wherein the first controller includes a vehicle function manager to manage the functions of the plurality of controllers, in a case where the vehicle function manager detects that a function of the gateway controller has been changed, a function-change detail is transmitted to the second controller and the third controller, and the second controller and the third controller update the respective determination references of its own control devices on the basis of the function-change detail transmitted from the first controller.

20. The inspection system according to claim 17, wherein the first controller includes a vehicle function manager to manage the functions of the plurality of controllers, in a case where the vehicle function manager detects that a function of the gateway controller has been changed, a function-change detail is transmitted to the second controller and the third controller, and the second controller and the third controller respectively update the first and the second determination references of its own control devices on the basis of the function-change detail transmitted from the first controller.

* * * * *